Oct. 9, 1923. 1,470,507
C. STEENSTRUP
METHOD OF MAKING ROTOR ELEMENTS FOR ELASTIC FLUID TURBINES
Filed Feb. 16, 1921
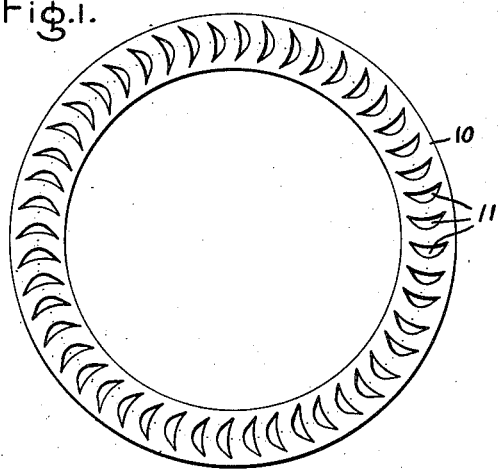
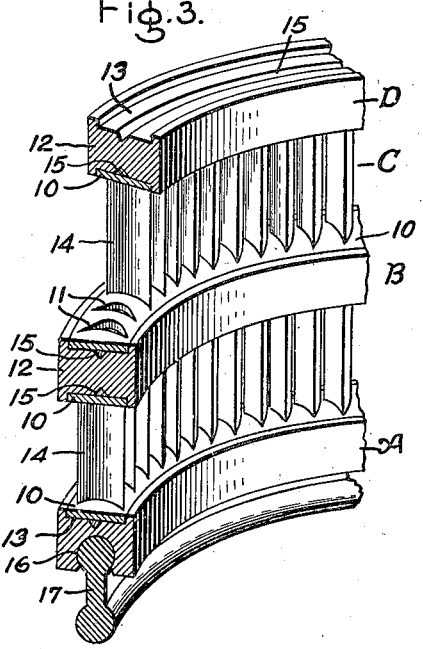
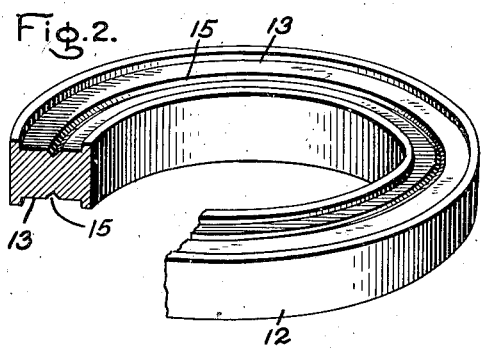
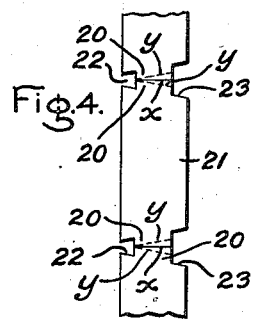
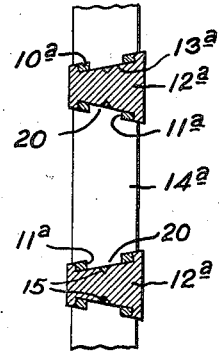
Inventor:
Christian Steenstrup,
by *Albert G. Davis*
His Attorney.

Patented Oct. 9, 1923.

1,470,507

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MAKING ROTOR ELEMENTS FOR ELASTIC-FLUID TURBINES.

Application filed February 16, 1921. Serial No. 445,572.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Making Rotor Elements for Elastic-Fluid Turbines, of which the following is a specification.

The present invention relates to elastic fluid turbines, particularly the rotor elements thereof and has for its object to provide an improved method of making the same.

The invention is applicable to rotor elements for turbines of either the radial flow or axial flow type and having wheel, drum or other construction. It is particularly applicable, however, to turbines of the radial flow type which comprises two opposed rotors which revolve in opposite directions and carry axially extending interleaving blade rings through which the motive fluid flows in a radial direction, and the invention is particularly illustrated and described in connection with such a turbine.

In such turbines each blade ring is attached at one end to a rotor, the other end being free, and the attaching means may comprise suitable expansion rings such as are now known in the art. The blade rings, being carried at one end only and extending axially, must be quite stiff and the same are accordingly provided with rings at their ends which serve to hold the ends of the blades, and with reinforcing rings between the ends. There may be one, two or more reinforcing rings according to the axial length of the blade rings and they serve to divide the blade rings into a number of blade sections. A completed blade ring thus has the appearance of a number of spaced rings with lengths of blading between them.

For a consideration of what I believe to be novel and my invention, attention is directed to the accompanying description and the claim appended thereto.

In the drawing, Fig. 1 is a side elevation of a mounting ring used in carrying out my invention; Fig. 2 is a perspective view of a reinforcing or supporting ring used in carrying out the invention, a section of the ring being broken away to better illustrate the structure; Fig. 3 is a perspective view of a part of a blade ring made in accordance with my invention; Fig. 4 is a side elevation and Fig. 5 a transverse section illustrating a turbine bucket and method of making the same for use in carrying out my method in connection with a modified structure; Fig. 6 is a sectional view showing a modified structure built in accordance with my method, and Fig. 7 is a sectional view of a mounting ring.

In carrying out my invention I provide mounting rings 10 as shown in Fig. 1 in which are punched openings 11 of a size and shape to receive either the ends of turbine blades or projections formed on such ends. Rings 10 are of a suitable thickness as shown in Fig. 3 and of outside diameter approximately equal to that desired for the blade ring and may be made from suitable metal. In making a ring 10, I preferably take a disk of metal of the desired thickness and of a diameter equal to the outside diameter of the finished mounting ring, mount it on a punch press and punch openings 11 therein. The press may be provided with a suitable indexing arrangement for spacing the openings and after they are all formed, the ring is parted from the disk. The remainder of the disk may be then used for forming a second mounting ring of less diameter and so on. By using a disc in which to punch the holes and then cutting off the ring with the holes therein, I am enabled to punch the holes with accuracy and without danger of their being incorrectly spaced from the margins of the ring.

I next provide reinforcing or supporting rings 12 as shown in Fig. 2 which are of suitable thickness and of a radial width slightly greater than that of rings 10. They are provided in either one or both faces with annular grooves 13 adapted to receive mounting rings 10. The supporting or reinforcing rings used at the inner and outer ends of the blade ring need have grooves 13 in one face only while those used at intermediate points have grooves 13 in both faces.

I then provide blades or buckets 14 of suitable shape and length. These may be made from strips of bucket material which are cut into lengths, and they may have straight ends or the ends may be formed with projections to suit the particular case.

To build up a blade ring structure as shown in Fig. 3, I take a supporting ring 12 which need have a groove 13 in one face only, for example, a ring such as that shown at A in Fig. 3 and place a mounting ring 10 in such groove. Ring 10 may fit groove 13 nicely and after it is in place the edges of the groove may be forced into engagement with it to firmly fix it therein. I then mount blades 14 around supporting ring 12 with their ends in openings 11 in mounting ring 10 thereby building a complete ring of blades. Openings 11 are of such size that the blade ends fit in them snugly so the blades will be firmly held in upright positions. Next I take a second supporting or reinforcing ring 12 having grooves 13 in both its faces into which mounting rings 10 have been fastened, and place it on top of the ring of projecting blades 14, the ends of the blades fitting into the openings 11 therein. Such a ring is indicated at B in Fig. 3. After ring B is in place, a second ring of buckets 14 is mounted in the openings in the mounting ring 10 on the upper side of supporting or reinforcing ring B, such ring of buckets being indicated at C. Following this a third mounting or reinforcing ring as indicated at D and having mounting rings 10 in its grooves is put into place and so on until a blade ring of the desired length is built up. The last ring 12 will of course need no groove 13 in its outer face.

After the completed blade ring is thus assembled I unite it into a unitary mass by fusion of metal as, for example, by brazing, welding, soldering or the like. Preferably, I unite the structure by the method of joining by fusion of metal as set forth in my application, Serial No. 354,014, filed Jan. 26, 1920. This method comprises placing the assembled structure in a suitable muffler containing a reducing atmosphere such as hydrogen and heating it, an alloying metal such as copper having been previously placed adjacent to the joints between the parts to be united. When heated to a suitable temperature, the copper enters the interstices between the parts and unites them to each other to form in substance an integral structure. However, my invention is not necessarily limited to this specific method of uniting the parts and it is to be understood that by the term "fusion of metal," I mean the particular method referred to or other suitable method. In carrying out this particular method, copper is preferably used as the uniting metal and at 15 I have indicated grooves in rings 12 in which copper may be placed for carrying out the uniting of the parts.

After the blade ring has been united into a unitary structure, it can be then given such finishing as found necessary and desirable to give it the required dimensions and adapt it for fastening to a rotor. In one type of radial flow turbine the blade rings are fastened to the rotor by expansion rings and in Fig. 3 I have shown ring A provided with a groove 16 in which is fastened an expansion ring 17 which is dumb-bell shaped in cross-section.

A complete blade ring system for a turbine may comprise a number of blade rings as shown in Fig. 3 which are of different diameters and arranged concentric and in carrying out my invention I may assemble blade rings for an entire blade system and then unite them by fusion of metal all at the same time. In this connection, it will be understood that the blade rings are of different lengths and may comprise, some of them only one blade section, and others two or more. The manner of making a blade ring having one or any number of blade sections will be clear from the description already given.

It is sometimes desirable to have the blade ends extend at an angle to the vertical or horizontal, that is, flare outwardly so the length of blade at the exit side is longer than that at the inlet side, and my present method lends itself readily for a structure of this character. An arrangement of this character is shown in Figs. 6 and 7 wherein the bucket passage is shown as flaring outwardly. The method of building up such a blade ring is the same as that already described the only change being in the shape of the parts used. As shown in Fig. 6, the supporting or reinforcing rings 12$^a$, corresponding to rings 12 of Figs. 3 are tapered or wedge-shaped and are provided with grooves 13$^a$ in which mounting rings 10$^a$ fit. The openings 11$^a$ in rings 10$^a$ are punched at an angle as best indicated in Fig. 7, and the bucket ends are formed with a corresponding angle so when fitted into openings 11$^a$ the buckets will stand straight. The bucket ends may fit directly into openings 11$^a$ or may have projections on their ends which fit into them. In the present instance, buckets 14$^a$ are shown provided with projections 20 which fit openings 11$^a$.

Buckets 14$^a$ may be formed from strips of bucket material after the manner illustrated in Figs. 4 and 5. Referring to these figures, 21 indicates a strip of bucket material of suitable shape and length. It is first provided with notches 22 and 23 along opposite sides, which notches are spaced apart to give the desired bucket lengths. The edges of the notches are formed at an angle as shown to give the correct slope to the bucket ends. After the notches have been formed, the buckets are then cut off along the full lines $x$ and finished by removing the material down to the dotted lines $y$. This gives buckets with ends having the correct angle and projections 20 to fit openings 11$^a$.

While I have specifically illustrated and described my invention in connection with a blade ring for radial flow turbines, this being one of its principal applications, it is to be understood that the method may be modified to adapt it to blade ring structures for other types of machines.

What I claim as new and desire to secure by Letters Patent of the United States, is:—

The method of manufacturing a turbine rotor element in which the exit edges of the buckets are of greater length than the inlet edges which comprises taking a plurality of wedge-shaped rings having annular grooves in their sloping surfaces, fastening mounting rings in said grooves, said mounting rings having spaced openings, assembling blades between the wedge-shaped rings with their ends in said openings, and uniting the rings and blades by fusion of metal.

In witness whereof, I have hereunto set my hand this 15th day of February 1921.

CHRISTIAN STEENSTRUP.